(12) United States Patent
Yang

(10) Patent No.: US 7,411,781 B2
(45) Date of Patent: Aug. 12, 2008

(54) LATCH DEVICE FOR PORTABLE COMPUTER

(75) Inventor: Hyun-Suk Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 11/123,107

(22) Filed: May 6, 2005

(65) Prior Publication Data

US 2006/0007649 A1   Jan. 12, 2006

(30) Foreign Application Priority Data

Jul. 6, 2004   (KR) .................... 10-2004-0052465

(51) Int. Cl.
   *G06F 1/16*   (2006.01)
(52) U.S. Cl. ............... 361/681; 361/683; 312/223.2; 312/333; 292/8; 292/56
(58) Field of Classification Search ......... 361/679–683; 312/223.1, 223.2; 292/8, 56
   See application file for complete search history.

(56) References Cited

U.S. PATENT DOCUMENTS

| 6,115,239 | A | 9/2000 | Kim |
| 7,072,690 | B2 * | 7/2006 | Shin et al. ................ 455/557 |
| 7,167,726 | B2 * | 1/2007 | Ghosh et al. ............. 455/557 |
| 2003/0007322 | A1 * | 1/2003 | Amemiya et al. ........... 361/683 |
| 2003/0011972 | A1 | 1/2003 | Koo |
| 2003/0142472 | A1 | 7/2003 | Park |
| 2005/0270734 | A1 * | 12/2005 | Lam et al. ................. 361/681 |

FOREIGN PATENT DOCUMENTS

| EP | 0 593 242 A2 | 4/1994 |
| EP | 1 452 947 A1 | 9/2004 |
| KR | 1997-0001232 U | 7/1995 |

* cited by examiner

*Primary Examiner*—Jayprakash N Gandhi
*Assistant Examiner*—Anthony Q Edwards
(74) *Attorney, Agent, or Firm*—Birch, Stewart, Kolasch & Birch, LLP

(57) ABSTRACT

A latch device for a portable computer secures a main body to a foldable display. The main body may be folded onto or unfolded with respect to the display about a hinge. The latch device may include a latch installation portion that is formed on a rear case of the display; a latch that is seated in the latch installation portion and may include a hook which passes through a front case of the display and protrudes forward from a front end of the display to be selectively hooked into a catching groove on the main body; and an elastic member that provides an elastic force in a direction in which the hook of the latch is hooked into the catching groove of the main body. A release mechanism that is exposed to the exterior of an end of the display to receive a driving force inputted for moving the latch. Accordingly, the locking engagement between the display and the main body of the portable computer is more secure, and the latch is easily assembled and disassembled.

21 Claims, 5 Drawing Sheets

LATCH DEVICE FOR PORTABLE COMPUTER

CROSS-REFERENCES TO RELATED APPLICATIONS

This nonprovisional application claims the benefit of Korean Application No. P2004-052465, filed on Jul. 6, 2004, the entirety of which is hereby incorporated by reference.

BACKGROUND OF THE INVENTION

1. Field of the Invention

The present invention relates to a portable computer, and more particularly, to a latch device for a portable computer permitting a main body and a display to be engaged with each other when the display is folded onto the main body.

2. Description of the Background Art

FIG. 1 is a perspective view of a portable computer according to the background art. FIG. 1A is an enlarged view of latch device shown in FIG. 1. As seen in FIG. 1, the portable computer includes a main body 1 of a substantially flat rectangular shape and a display 3 that pivots about a hinge 5 at a rear end of the main body 1. The display 3, which is formed in a plate shape corresponding to the main body 1, is folded and seated onto an upper face of the main body 1 when safekeeping or carrying the portable computer. As also seen in FIG. 1, the display 3 is unfolded with respect to the main body 1 at a predetermined angle for use.

An interior of the main body 1 is provided with a mainboard and the like of the portable computer, and the upper face of the main body 1 is provided with a keyboard 7. The keyboard 7 is a portion through which desired information is inputted as a user presses keys. The display 3 is provided with a liquid crystal panel 9 that displays information.

When the display 3 and the main body 1 are folded on each other to be secured in a safe storage position, e.g., to permit being transported or carried, latch devices 10 engage the display 3 and the main body 1 to each other. The latch devices 10 are provided at corresponding portions at front ends of a rear case 11 and a front case 12 which defines an external appearance of the display 3. The number of the latch devices 10 may be properly determined according to a width of the display 3.

The rear case 11 defines a rear face of the display 3, while the front case 12 forms a frame of a front edge of the display 3. The front case 12, which is formed in a rectangular frame shape, functions to seal and support an edge of the liquid crystal panel 9 of the display 3.

A space formed between the rear case 11 and the front case 12 is provided with latches and the like forming the latch devices 10. That is, the latches (not shown) are provided in the space between the rear case 11 and the front case 12 so that hooks 14 protrude forward from a front end of the front case 12. The hooks 14 are selectively hooked into catching grooves 1' formed at a front end of the upper face of the main body 1. A release mechanism 13 for operating the hook 14 is exposed to a portion corresponding to a side face of the front end of the display 3.

However, the present inventor has determined that the above-described example of the background art suffers from the following disadvantages. The latch devices 10 engage the display 3 to the main body 1 so that the display 3 and main body 1 are not inadvertently unfolded with respect to each other when storing the computer for safekeeping or when transporting the portable computer. However, if the portable computer has large dimensions and the display 3 a relatively wide screen, forces applied to the hooks 14 when the hooks 14 are hooked into the main body 1 are increased as a width of the portable computer is relatively increased. If the forces applied to the hooks are increased, since large forces are also applied to the hooks 14 or the catching grooves 1', the hooks can be broken or damaged.

Specifically, if the front case 12 is formed to bear most of the forces applied to the hooks 14, a smile gap, that is, a gap between the front case 12 and the rear case 11, may occur, easily causing breakage or deformation of the front case 12. Since the front case 12 is formed in a rectangular frame shape, the front case 12 is relatively weak in this respect.

In addition, major components of the latch device 10 are positioned in a space between the rear case 11 and the front case 12. Therefore, the latch device 10 is assembled in a main assembling line just before the rear case 11 and the front case 12 are assembled. However, since the liquid crystal panel 9, the latch device 10 and the like are assembled in such a main assembling line, the number of assembling steps is undesirably increased and ease of assembly and workability is reduced.

SUMMARY OF THE INVENTION

The present invention overcomes the shortcomings associated with the background art and achieves other advantages not realized by the background art.

An object of the present invention is to provide a latch device that securely engages a main body and a display to each other.

An object of the present invention is to provide a latch device that is easily assembled in display of a personal computer.

One or more of these and other objects are accomplished by a latch device for a portable computer having a display enclosed within a front case and a rear case, said latch device comprising a latch installation portion formed within the rear case; a latch seated in the latch installation portion, said latch including a hook protruding from said latch installation portion and extending through the front case and being capable of interlocking with a catching groove; an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force.

One or more of these and other objects are further accomplished by a latch device for a portable computer having a display enclosed within a front case and a rear case, said latch device comprising a latch installation portion formed on a surface within the rear case; a latch seated in the latch installation portion, said latch including a hook protruding from said latch installation portion and extending through the front case and being capable of interlocking with a catching groove; an antenna cover mounted on the surface of the rear case and covering the latch installation portion; an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force.

One or more of these and other objects are further accomplished by a housing for a portable computer comprising a lower housing portion for storing a keyboard; an upper housing portion having a front case and a rear case for storing a display, said upper housing being foldable about a hinge positioned between said lower housing and said upper housing; and a latch device, said latch device including a latch installation portion formed within the rear case; a latch seated in the latch installation portion, said latch including a hook protruding from said latch installation portion and extending through the front case and being capable of interlocking with a catching groove formed within said lower housing portion; an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force.

One or more of these and other objects are further accomplished by a housing for a portable computer comprising a lower housing portion for storing a keyboard; an upper housing portion having a front case and a rear case for storing a display, said upper housing being foldable about a hinge positioned between said lower housing and said upper housing; and a latch device, said latch device including a latch installation portion formed on a surface within the rear case; a latch seated in the latch installation portion, said latch including a hook protruding from said latch installation portion and extending through the front case and being capable of interlocking with a catching groove; an antenna cover mounted on the surface of the rear case and covering the latch installation portion; an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force.

The latch installation portion may be formed with a latch seating space in which the latch is seated, and the latch seating space opens toward a rear face of the rear case and is formed with a hook slot opening toward the front case and through which the hook passes.

A rear face of the rear case, which is formed with the latch installation portion, may be formed with a stepped, cover seating face and an antenna cover is seated on and fastened to the stepped, cover seating face.

The latch may include a latch body seated in the latch seating space of the latch installation portion, the hook projecting from an end of the latch body and having a catching projection at a front end thereof.

The hook may pass through the front case and protrude forward from the front case. An elastic guide member guide extending opposite to a projection direction of the catching projection can be provided at an end of the latch body. The elastic member can then be installed on the elastic guide member guide and the release mechanism, e.g., such as a knob, slide switch or button may be integrally formed on the latch body.

The latch may further include a moving guide bar provided between the latch body and the release mechanism, so that a movement of the latch is guided along a surface of the latch installation portion. Both ends of the moving guide bar may also be provided with stoppers for limiting moving stroke of the latch, respectively.

A side of the latch body may be formed with a guide for guiding a movement of the latch, and the guide is capable being moved in a guide slot that is formed through a side of the latch installation portion.

According to various embodiments of the present invention described hereinabove, an engagement between the display and the main body formed within the lower housing portion becomes more secure, and the ease of assembly and disassembly of the latch device is greatly improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
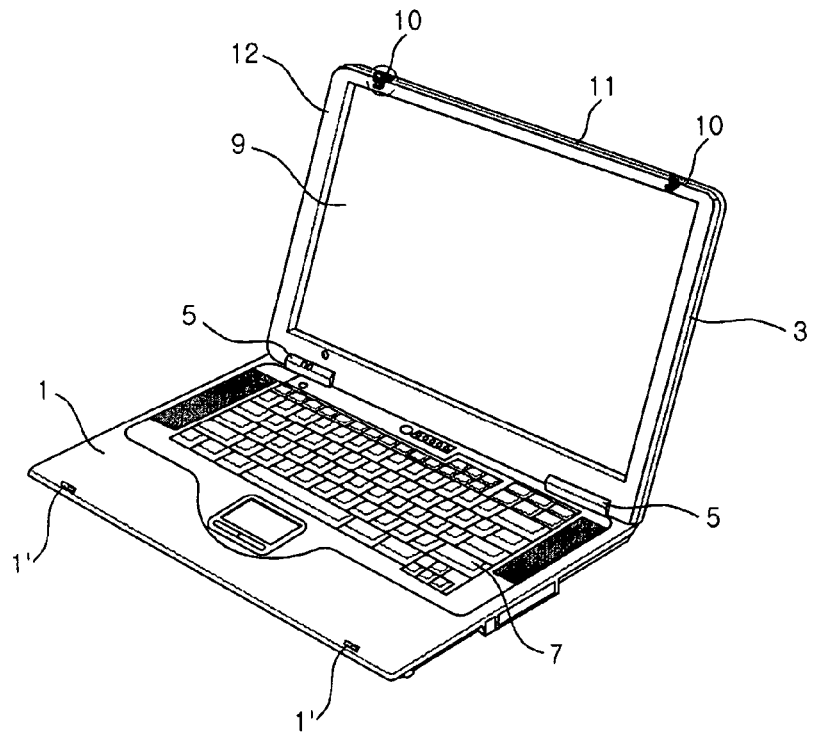
FIG. 1 is a perspective view showing a portable computer of the background art.
Figure 1A:
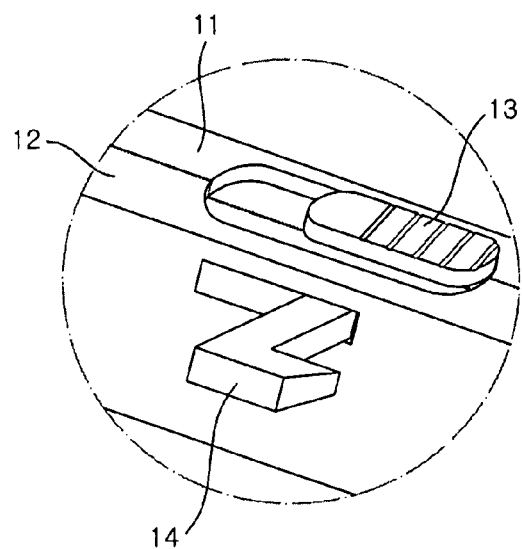
FIG. 1A is an enlarged view of latch device shown in FIG. 1.
Figure 2:
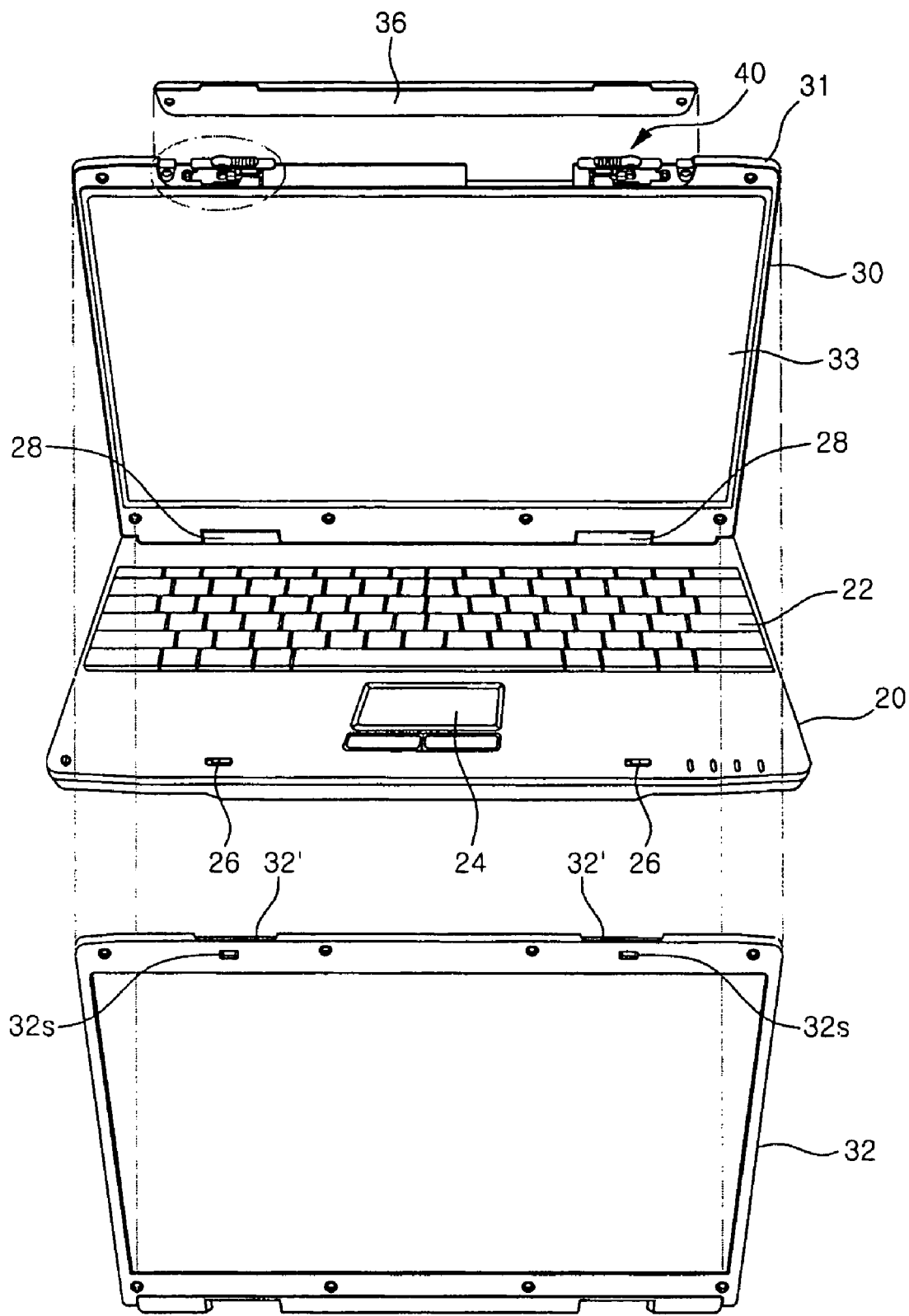
FIG. 2 is an exploded perspective view showing a portion of a portable computer having latch devices according to the present invention.
Figure 2A:
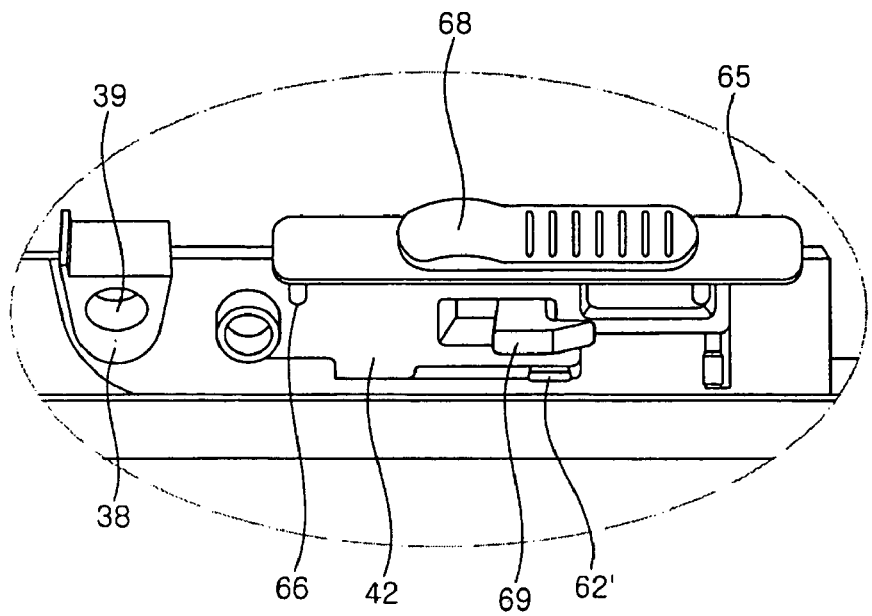
FIG. 2A is an enlarged view of a latch device shown in FIG. 2.
Figure 3:
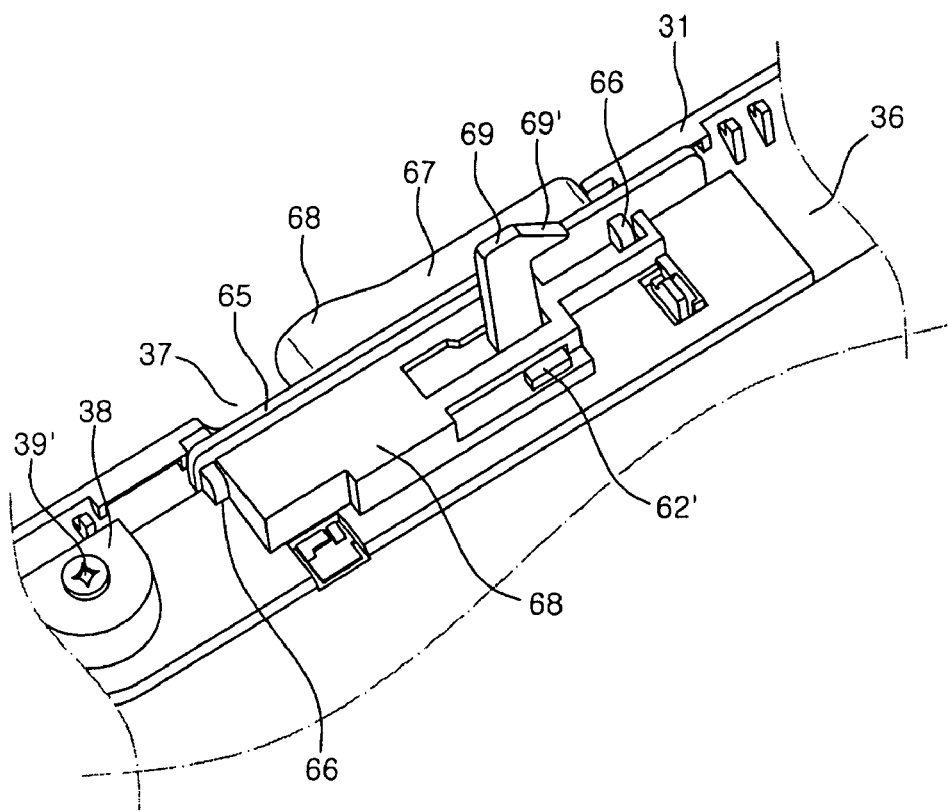
FIG. 3 is a perspective view of a latch device according to an embodiment of the present invention with a front case of the upper housing portion removed.
Figure 4:
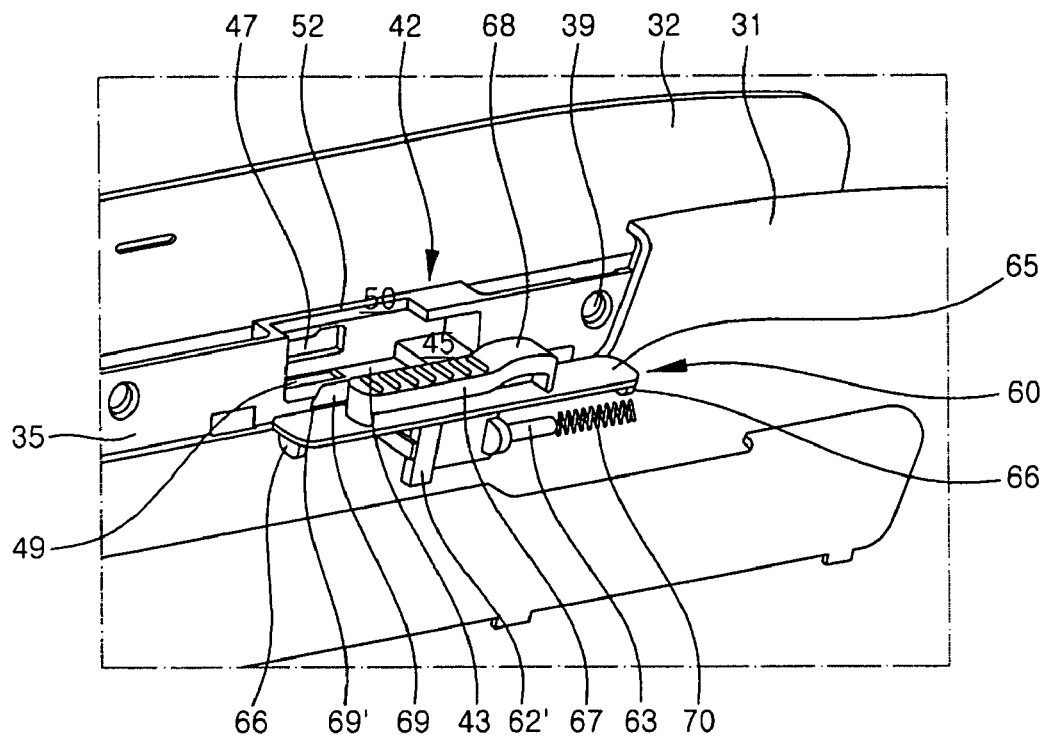
FIG. 4 is a perspective view showing a latch device and a rear case having a latch installation portion according to an embodiment of the present invention.
Figure 5:
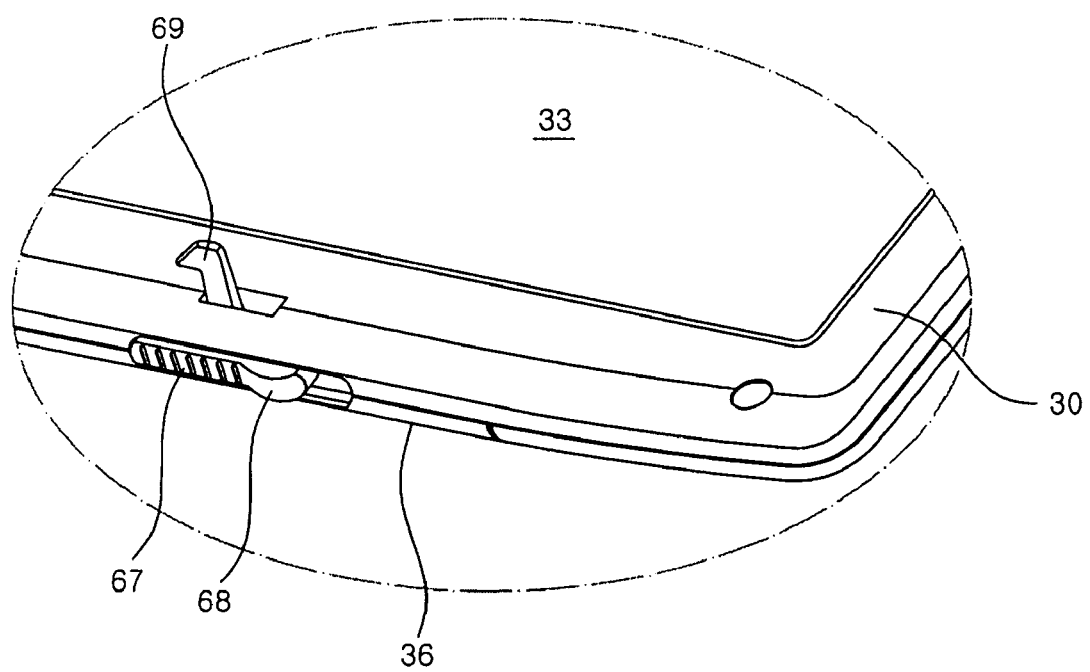
FIG. 5 is a perspective view of a portion of a latch device according to an embodiment of the present invention.
Figure 6A:
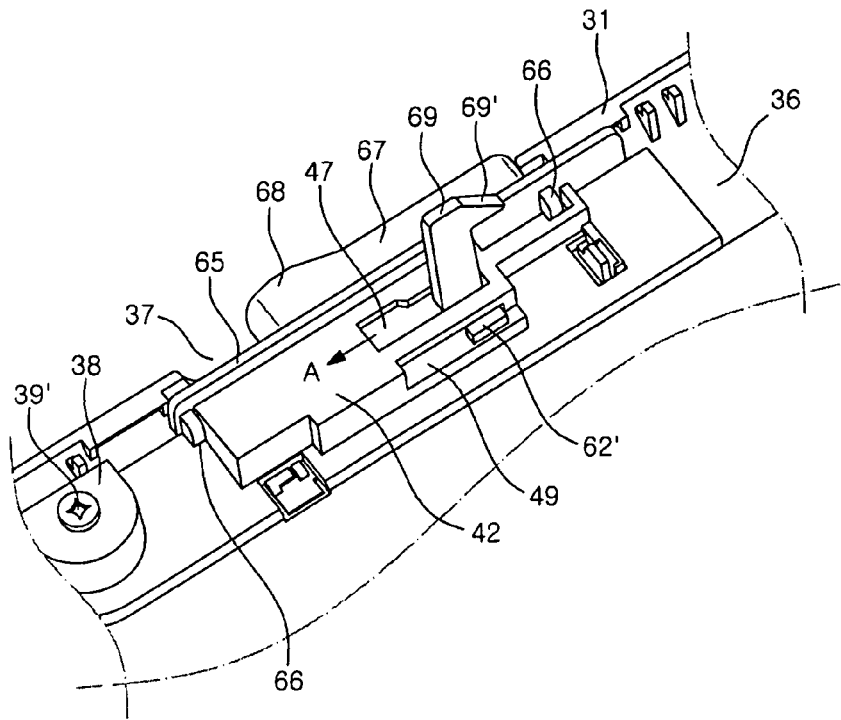
FIGS. 6A and 6B are views showing operating positions of the latch device according to an embodiment of the present invention.
Figure 6B:
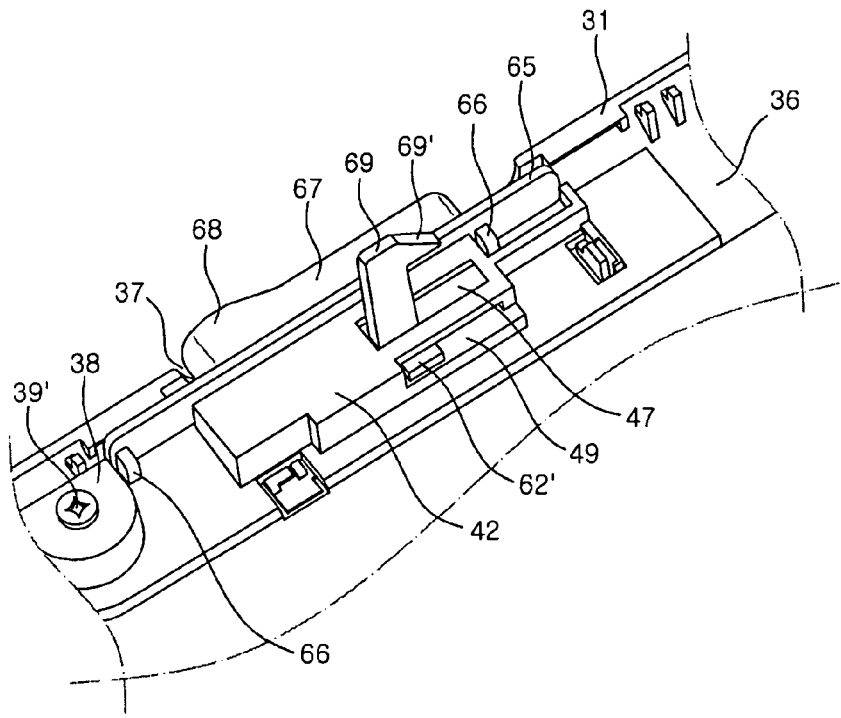

The present invention will be described hereinafter with reference to the accompanying drawings. FIG. 2 is an exploded perspective view showing a portion of a portable computer having latch devices according to the present invention. FIG. 2A is an enlarged view of a latch device shown in FIG. 2. FIG. 3 is a perspective view of a latch device according to an embodiment of the present invention with a front case of the upper housing portion removed. FIG. 4 is a perspective view showing a latch device and a rear case having a latch installation portion according to an embodiment of the present invention. FIG. 5 is a perspective view of a portion of a latch device according to an embodiment of the present invention. FIGS. 6A and 6B are views showing operating positions of the latch device according to an embodiment of the present invention.

According to the figures, various parts are installed in a main body 20 of lower housing portion of a portable computer, which is formed in a substantially rectangular plate shape. An upper face of the main body 20 is provided with a keyboard 22. A center of a front end of the upper face of the main body 20 is provided with a touchpad 24 that serves as a pointing device. Both sides of the front end of the upper face of the main body 20 are provided with catching grooves 26. The catching grooves 26 are portions into which hooks 69 may be secured for engaging the main body 20 and a display 30.

The display 30 is pivotably connected to a rear end of the main body 20 through a hinge 28. The rear end of the main body 20 is formed in an upper housing portion having a rear case 31 and a front case 32. The display 30 pivots about the hinge 28 to be folded onto the main body 20 or unfolded with respect thereto at a predetermined angle. An external appearance of the display 30 is formed by the rear case 31 and the front case 32. The rear case 31 defines a rear face of the display 30, while the front case 32 of a rectangular frame shape forms a front edge of the display 30. Both ends of the front case 32 are provided with slot forming portions 32', respectively. The slot forming portions 32' cooperate with a cover 36, which will be described below, so as to form release mechanism slots 67' in which release mechanisms 67 move. Through slots 32s are formed in a front face of an upper end of the front case 32. The through slots 32s are portions through which the hooks 69 pass to permit the hooks 69 to protrude forward from the front case 32.

A front face of the display 30 is provided with a liquid crystal panel 33. However, instead of the liquid crystal panel 33, other display modules may be employed. The liquid crystal panel 33 is covered along its edge with a predetermined width by the front case 32. A front end of the rear case 31, which is opposite to a portion connected to the hinge 28, is formed with cover seating faces 35. The cover seating faces 35 are stepped in an outer face of the rear case 31. The cover 36 is fastened to the cover seating faces 35.

The cover 36 may cover an antenna for wireless communications and the latches installation portions 42 together. The cover is molded so that signals are smoothly transmitted and received by means of an antenna (not shown) for wireless communications. Both ends of the cover 36 are provided with slot forming portions 37, which cooperate with the slot forming portions 32' of the front case 32 to form the release mechanism slots 67' for movement of the release mechanisms 67, respectively.

Mounting bosses 38 protrude opposite to the cover sewing faces 35 in order to fastening the cover 36. Each of the mounting bosses 38 is formed with a mounting hole 38. A mounting screw 39' is fastened to the mounting hole 38.

Latch devices 40 are installed at both sides of a front end of the display 30 corresponding to the catching grooves 26, respectively. The latch devices 40 serve to engage and secure the display 30 to the main body 20. The structure of the latch devices 40 will be described in greater detail hereinafter.

Latch installation portions 42 are formed on portions of the rear case 31 in which the cover seating face 35 is formed. The latch installation portions 42 are more concave than the cover seating faces 35, e.g., the latch installation portions 42 may be formed as recessed portions that protrude away from the front surface of the roar case 31 and/or inwardly with respect to the rear surface of the rear case 31. A concave or recessed portion of each latch installation portion 42 is formed by a latch seating space 43. Since the latch seating space 43 is a recess formed on the cover seating face 35, to latch installation portion 42 protrudes opposite to the cover seating face 35. Accordingly, as shown in FIG. 3, the latch installation portion 42 protrudes toward a rear face of the front case 32 opposite to the cover 36.

The latch installation portion 42 is formed with an elastic member seating space 45 that is in communication with the latch seating space 43. The latch seating space 43 and the elastic member seating space 45 open in a direction of a rear surface of the rear case 31. The latch installation portion 42 is formed with a hook slot 47 so that the latch seating space 43 is in communication with an exterior face of the front case 32. The hook slot 47 is a portion through which the hook 69 of a latch 60 which will be described below passes. In the latch installation portion 42, a guide slot 49 is formed on a surface perpendicular to a surface in which the hook slot 47 is formed so that the latch seating space 43 is in communication with the exterior of the rear case. A guide 62' is movably installed within the guide slot 49.

A body opening 50 is formed in a side of the latch installation portion 42, e.g., in a face opposite to the guide slot 49. The body opening 50 is formed so that the latch installation portion 42 does not interfere with a portion at which a moving guide bar 65 and latch body 62 of the latch 60, which will be described below, are connected to each other. The body opening 50 is designed so that a length thereof is calculated by adding a length of the latch body 62 to a moving stroke of the latch body 62.

An opposite side of the cover seating face 35 is formed with a hook plate 52. The hook plate 52 protrudes toward the front case 32, e.g., in the same direction as the latch installation portion 42. Any one of stoppers 66 of the latch 60 is selectively caught on the hook plate 52.

The latch 60 is installed in the rear case 31, and makes it possible to engage the lower housing portion of the main body 20 and the upper housing portion containing the display 30 of the portable computer to each other. The latch body 62 of the latch 60 is seated in the latch seating space 43. The latch body 62 is designed with dimensions that make it possible for the latch body 62 to move in the latch seating space 43. The guide 62' is formed on a side of the latch body 62 in order to guide the movement of the latch body 62. The guide 62' is seated in the guide slot 49 and guides the movement of the latch 60.

A side of the latch body 62 is provided with an elastic guide member 63. The elastic guide member 63 makes it possible to exactly apply an elastic force of an elastic member 70 seated in the elastic member seating space 45 to the latch 60. The latch body 62 is formed with the elongated moving guide bar 65. The moving guide bar 65 is movably seated in a face of the latch installation portion 42 perpendicular to the cover seating face 35. Both ends of the moving guide bar 65 are provided with the stoppers 66, respectively. The stoppers 66 serve to limit a moving stroke of the latch 60 between a first operating position and a second operating position.

The moving guide bar 65 also serves to cause the latch installation portion 42 and the like not to be exposed to the outside of the display 30. Specifically, the moving guide bar 65 is positioned within a region where the cover 36 and the front case 32 are engaged with each other and then covers an opened portion within the release mechanism slot 67'.

The latch 60 is provided with the release mechanism 67. The release mechanism 67, which is exposed to the outside of the display 30, is operated by a user's finger and may be formed as a button, slide bar or other actuating member. A surface of the release mechanism 67 may be formed with projections for providing friction to maintain a user's finger in contact with the release mechanism 67. An end of the release mechanism 67 may also be provided with a catching protrusion 68. It is preferred that the catching protrusion 68 be provided in a direction in which the elastic guide member 63 is formed. The catching protrusion 68 also helps to maintain a user's finger in contact with the release mechanism 67 when the user's finger operates the release mechanism 67. The release mechanism 67 is provided on the moving guide bar 65. A connecting portion at which the release mechanism 67 and the moving guide bar 65 are connected to each other is positioned in an opened portion of the release mechanism slot 67'.

The latch body 62 is provided with the hook 69. A front end of the hook 69 is formed with a catching projection 69'. A direction of the catching projection 69' is opposite to an extension direction of the elastic guide member 63. For reference, the catching projection 69' protrudes in a direction in which the elastic force of the elastic member 70 is applied.

For example, when two of the latch devices 40 are provided, the respective latches 60 may operate opposite to each other. The hooks 69, the elastic guide members 63, and the catching protrusions 68 formed on the release mechanisms 67 of the respective latches 60 used in such a case are formed so as to extend and move in directions opposite to each other.

The latch body 62 is seated in the latch seating space 43 of the latch installation portion 42, and the elastic guide member 63 passes through the elastic member 70 positioned in the elastic member seating space 45, so that the latch 60 is installed. The elastic member 70 generates the elastic force in a projection direction of the catching projection 69' provided at the front end of the hook 69 of the latch 60, and may include a coil spring positioned within elastic member seating space 45.

An exemplary operation of the latch device of the portable computer according to the present invention will be described in greater detail hereinafter. First, a process for assembling the latch devices 40 of the present invention to the display 30 will be described. The latch body 62 of each latch 60 is seated in the latch seating space 43 formed on the latch installation portion 42 of the rear case 31.

The elastic guide member 63 is seated in the elastic member seating space 45 with the elastic member 70 being installed therein. The hook 69 passes through the hook slot 47 and protrudes forward away from the display. The guide 62' is movably positioned in the guide slot 49. If the latch bodies 62 are seated in the latch seating spaces 43, respectively, the latches 60 are temporarily assembled to the rear case 31.

The cover 36 is next seated on the cover seating faces 35 of the rear case 31. If the cover 36 is seated on the cover seating faces 35, the latch seating spaces 43 and the elastic member seating spaces 45 are closed by the cover 36. Therefore, the latches 60 are completely assembled to the rear case 31 by the cover 36. At this time, the release mechanisms 67 are positioned within the slot forming portions 37 of the cover 36, respectively.

Since the latches 60 are completely assembled to the rear case 31 by the antenna cover 36, the assembling process of the latches 60 may be performed regardless of the installation of the liquid crystal panel 33, e.g., before or after the display module has actually been installed. For example, the rear case 31 with the latch 60 previously assembled may be introduced into an assembly line of the portable computer.

After the liquid crystal panel 33 is seated in the rear case 31, the front case 32 is assembled to the rear case 31. The front case 32 may be temporarily assembled to the rear case 31 by mechanical configuration of the front case 32, and then completely and more securely fastened thereto by screws.

An operation of the latch 60 will be described in greater detail hereinafter. If the display 30 is folded onto the main body 20, the hooks 69 of the latches 60 are automatically hooked into the catching grooves 26 of the main body 20. When the display 30 is folded onto the main body 20, the catching projections 69' of the hooks 69, which protrude forward from the front case 32, enter the catching grooves 26, respectively.

When the catching projection 69' enters the catching groove 26, the latch 60 moves in a direction in which the elastic member 70 is compressed with the elastic force of the elastic member 70 being overcome. For example, the latch 60 moves in the direction of an arrow A shown in FIG. 6A. When the latch 60 moves, the guide 62' is guided in the guide slot 49, and the hook 69 is guided in the hook slot 47 and the through slot 32s.

If the catching projection 69' fully enters the catching groove 26, the latch 60 moves to a position shown in FIG. 6B by the elastic force of the elastic member 70, and the catching projection 69' is hooked into the catching groove 26. Therefore, the display 30 is engaged to the main body 20.

An operation for unfolding the display 30 with respect to the main body 20 will be described in greater detail hereinafter. The user moves both the release mechanisms 67 while overcoming the elastic forces of the respective elastic members 70. Accordingly, the catching projection 69' is unhooked from the respective catching groove 26 by moving the release mechanism 67 in the direction of the arrow A shown in FIG. 6A.

The display 30 is then unfolded with respect to the main body 20 by rotating the display 30 about the hinge 28. Once the display 30 begins to be unfolded with respect to the main body 20, it is no longer necessary to hold the release mechanisms 67 by the user's fingers. If the forces for holding the release mechanisms 67 are removed, the latches 60 are returned to their initial positions by the restoring forces of the elastic members 70.

The present inventors have determined that the following advantages are achieved by the latch device of the portable computer of the present invention. First, since the latches are installed in the rear case, particularly in the latch installation portions integrally formed in the rear case, a rear case with a relatively large area and strength can bear the forces applied to the latches. Further, since the rear case and the main body are substantially engaged by way of the latches, the display and the main body are securely engaged to each other.

Furthermore, in the present invention, even when the front case is not assembled to the rear case, the latches may be fully assembled in the rear case. Therefore, it is relatively easy to assemble and disassemble the latches, and the assembly order in an assembly line may be easily implemented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A latch device for a portable computer having a display enclosed within a front case and a rear case, said latch device comprising:
   a latch installation portion formed within the rear case;
   a latch seated in the latch installation portion, said latch including a hook protruding from said latch installation portion and extending through the front case and being capable of interlocking with a catching groove;
   an elastic member providing an elastic locking force for securing the hook within the catching groove; and
   a release mechanism engaged with at least one of the front case and the rear case and being operatively movable responsive to an input force and with respect to an exterior of an end of the display, said hook being movable between a first position and a second position responsive to the input force, wherein the latch installation portion includes a latch seating space being formed in the rear case, wherein the latch is seated within said latch seating space, said latch seating space opening toward a rear face of the rear case and being formed with a hook slot opening toward the front case, wherein the front case covers a front of the rear case and includes a front case hook slot corresponding to the hook slot opening, and wherein said hook passes through said hook slot opening and the front case hook slot.

2. The latch device according to claim 1, wherein the latch installation portion is formed in a rear face of the rear case, said rear case further including:
   a stepped, cover seating face, and
   a cover being seated on and fastened to the stepped, cover seating face.

3. The latch device according to claim 1, wherein the latch installation portion is formed in the rear face of the rear case, said rear case further including:
   a stepped, cover seating face, and
   a cover being seated on and fastened to the stepped, cover seating face.

4. The latch device according to claim 2, wherein the antenna-cover is formed of resin or plastic.

5. The latch device according to claim 2, wherein the rear case is formed of a metal.

6. The latch device according to claim 2, said latch further conspiring:
   a latch body seated in the latch seating space of the latch installation portion, said hook projecting from an end of the latch body and having a catching projection at a front end thereof, wherein the hook passes through the front case and protrudes forward from the front case and away from said rear case and said release mechanism is formed integrally with the latch body; and
   an elastic guide member extending in a direction opposite to a projection direction of the catching projection on another end of the latch body, the elastic member being engaged with the elastic guide member.

7. The latch device according to claim 3, said latch further comprising:
   a latch body seated in the latch seating space of the latch installation portion, said hook projecting from an end of the latch body and having a catching projection at a front end thereof, wherein the hook passes through the front case and protrudes forward from the front case and away from said rear case and said release mechanism is formed integrally with the latch body; and
   an elastic guide member extending in a direction opposite to a projection direction of the catching projection on another end of the latch body, the elastic member being engaged with the elastic guide member.

8. The latch device according to claim 6, wherein the latch further comprises a moving guide bar being provided between the latch body and the release mechanism to guide the latch along a surface of the latch installation portion responsive to the input force.

9. The latch device according to claim 7, wherein the latch further comprises a moving guide bar being provided between the latch body and the release mechanism to guide the latch along a surface of the latch installation portion responsive to the input force.

10. The latch device according to claim 8, wherein ends of the moving guide bar are provided with stoppers for limiting a moving stroke of the latch.

11. The latch device according to claim as claimed in claim 6, wherein a side of the latch body is formed with a guide for guiding a movement of the latch, and the guide moves in a guide slot which is formed in a side of the latch installation portion.

12. The latch device according to claim 1, wherein the elastic member is secured in the rear case.

13. The latch device according to claim 6, wherein the latch seating space is formed with a hook slot opening toward the front case and through which the hook protrudes away from the rear case, and the latch seating space is provided with a guide slot in which a guide formed in a side of the latch body is seated for guiding the latch body between a first position and a second position responsive to the input force.

14. The latch device according to claim 6, wherein the release mechanism and the latch body are connected to each other through a connecting portion, and a release mechanism slot is formed between the cover and the front case, said connecting portion being movable engaged with the release mechanism slot.

15. The latch device according to claim 1, wherein the hook slot opening is integral with the rear case.

16. A latch device For a portable computer having a display enclosed within a front case and a rear case, said latch device comprising:
   a latch installation portion formed on a surface within the rear case;
   a latch seated in the latch installation portion, said latch including a hook protruding from said latch installation portion and extending through the front case and being capable of interlocking with a catching groove;
   a cover mounted on the surface of the rear case and covering the latch installation portion;
   an elastic member providing an elastic locking force for securing the hook within the catching groove; and
   a release mechanism engaged with at least one of the front case and the rear case and being operatively movable responsive to an input force and with respect to an exterior of an end of the display, said hook being movable between a first position and a second position responsive to the input force,
   wherein the latch installation portion includes a latch seating space being formed in the rear case,
   wherein the latch is seated within said latch seating space, said latch seating space opening toward a rear face of the rear case and being formed with a hook slot opening toward the front case,
   wherein the front case covers a front of the rear case and includes a front case hook slot corresponding to the hook slot opening, and
   wherein said hook passes through said hook slot opening and the front case hook slot.

17. The latch device according to claim 16, wherein the hook slot opening is integral with the rear case.

18. A housing for a portable computer comprising:
   a lower housing portion for storing a keyboard;
   an upper housing portion having a front case and a rear case for storing a display, said upper housing being foldable about a hinge positioned between said lower housing and said upper housing; and
   a latch device, said latch device including
      a latch installation portion formed within the rear case;
      a latch seated in the latch installation portion, said latch including a hook protruding from said latch installation portion and extending through the front case and being capable of interlocking with a catching groove formed within said lower housing portion;

an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force, wherein the latch installation portion includes a latch seating space being formed in the rear case, wherein the latch is seated within said latch seating space, said latch seating space opening toward a rear face of the rear case and being formed with a hook slot opening toward the front case, wherein the front case covers a front of the rear case and includes a front case hook slot corresponding to the hook slot opening, and wherein said hook passes through said hook slot opening and the front case hook slot.

19. The housing according to claim 18, wherein the book slot opening is integral with the rear case.

20. A housing for a portable computer comprising:

a lower housing portion for storing a keyboard;

an upper housing portion having a Front case and a rear case for storing a display, said upper housing being foldable about a hinge positioned between said lower housing and said upper housing; and a latch device, said latch device including a latch installation portion formed on a surface within the rear case;

a latch seated in the latch installation portion, said latch including a hook protruding from said latch installation portion and extending through the front case and being capable of interlocking with a catching groove;

a cover mounted on the surface of the rear case and covering the latch installation portion;

an elastic member providing an elastic locking force for securing the hook within the catching groove; and a release mechanism engaged with at least one of the front case and the rear case and being operatively movable responsive to an input force and with respect to an exterior of an end of the display, said hook being movable between a first position and a second position responsive to the input force, wherein the latch installation portion includes a latch seating space being formed in the rear case, wherein the latch is seated within said latch seating space, said latch seating space opening toward a rear face of the rear case and being formed with a hook slot opening toward the front case, wherein the front case covers a front of the rear case and includes a front case hook slot corresponding to the hook slot opening, and wherein said hook passes through said hook slot opening and the front case hook slot.

21. The housing according to claim 20, wherein the hook slot opening is integral with the rear case.

* * * * *